(12) United States Patent
Bae

(10) Patent No.: US 9,612,620 B2
(45) Date of Patent: Apr. 4, 2017

(54) DISPLAY DEVICE AND A DRIVING METHOD THEREOF

(71) Applicant: LG Display Co., Ltd., Seoul (KR)

(72) Inventor: Hyungguk Bae, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 124 days.

(21) Appl. No.: 14/105,707

(22) Filed: Dec. 13, 2013

(65) Prior Publication Data

US 2014/0168202 A1    Jun. 19, 2014

(30) Foreign Application Priority Data

Dec. 18, 2012  (KR) .................. 10-2012-0148736

(51) Int. Cl.
*G06F 3/038*   (2013.01)
*G06F 1/16*    (2006.01)

(52) U.S. Cl.
CPC .................................. *G06F 1/1652* (2013.01)

(58) Field of Classification Search
None
See application file for complete search history.

(56) References Cited

U.S. PATENT DOCUMENTS

| 6,597,410 B1* | 7/2003 | Doany ............... H04N 5/74 345/157 |
| 2010/0188422 A1* | 7/2010 | Shingai ............ G06F 3/016 345/647 |
| 2012/0092363 A1* | 4/2012 | Kim et al. ............ 345/618 |
| 2012/0115422 A1* | 5/2012 | Tziortzis et al. ........ 455/73 |
| 2012/0235893 A1* | 9/2012 | Phillips et al. ........ 345/156 |
| 2013/0083298 A1* | 4/2013 | Yoshimura ....... G03B 21/006 353/69 |
| 2014/0055696 A1* | 2/2014 | Lee et al. ............... 349/20 |

FOREIGN PATENT DOCUMENTS

| JP | 2002-006797 A | 1/2002 |
| JP | 2005-149420 A | 6/2005 |
| JP | 2005-293197 A | 10/2005 |

OTHER PUBLICATIONS

Japan Patent Office, Office Action, Japanese Patent Application No. 2013-259146, Nov. 13, 2014, four pages.

* cited by examiner

*Primary Examiner* — Joseph Haley
*Assistant Examiner* — Ifedayo Iluyomade
(74) *Attorney, Agent, or Firm* — Fenwick & West LLP

(57) ABSTRACT

Provided are a display device and a driving method thereof, the display device including: a display panel having a curvature radius; a driver driving the display panel; a timing controller controlling the driver; an image processor supplying an image signal to the timing controller; and an image corrector compressing or expanding the image signal in response to the curvature radius of the display panel.

15 Claims, 9 Drawing Sheets

IMAGE SIGNAL DISPLAYED ON DISPLAY PANEL BEFORE CORRECTION

CORRECTED IMAGE SIGNAL

IMAGE SIGNAL DISPLAYED ON DISPLAY PANEL AFTER CORRECTION

DISPLAY DEVICE AND A DRIVING METHOD THEREOF

This application claims the benefit of Korean Patent Application No. 10-2012-0148736 filed on Dec. 18, 2012, which is hereby incorporated by reference.

BACKGROUND

Field

The present invention relates to a display device and a driving method thereof.

Description of the Related Art

With the development of information technology, the market of flat display devices, which are connecting media between a user and information, are growing. Thus, flat display devices, such as an Organic Light Emitting Display (OLED), a Liquid Crystal Display (LCD), an Electro Phoretic Display (EPD), a Plasma Display Panel (PDP), and the like, have been increasingly used.

Among the above-exemplified flat display devices, the OLED, LCD, EPD, and the like may have flexibility. Therefore, there have been conducted various searches therefor, such as configuring display panels thereof to have a curved surface on which an image is displayed, and the like.

The method by which a display panel is implemented to have a curved surface on which an image is displayed may be conducted in the same manner in which general flat display devices are manufactured, but has different features in that metal or plastic materials instead of glass are used for a substrate and the display panel has a curvature radius.

However, the related art has a disadvantage in that, since a conventional image signal itself is displayed on the display panel having a curvature radius, the image displayed on a particular region is distorted. Moreover, the related art has a disadvantage in that, since a central region and an edge region of the display panel having a curvature radius have a difference in perspective, a display region far from a user is shown larger than a display region closer to the user. Therefore, the display device of the related art, composed of a display panel having a curvature radius, needs to be improved to solve the foregoing advantages.

SUMMARY

According to an aspect of the present invention, there is provide a display device, including: a display panel having a curvature radius; a driver driving the display panel; a timing controller controlling the driver; an image processor supplying an image signal to the timing controller; and an image corrector compressing or expanding the image signal in response to the curvature radius of the display panel.

According to another aspect of the present invention, there is provide a driving method of a display device, the method including: reading a curvature coefficient of a display panel; reading an image signal, which is to be supplied to the display panel, by the line unit; compression-correcting or expansion-correcting the image signal based on the curvature coefficient corresponding to the curvature of the display panel such that an edge portion of the image signal concavely recedes or convexly protrudes; and supplying the corrected image signal to the display panel and displaying the corrected image signal on the display panel.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION OF PREFERRED EMBODIMENTS

Reference will now be made in detail embodiments of the invention examples of which are illustrated in the accompanying drawings.

Hereinafter, specific embodiments of the present invention will be described with reference to the accompanying drawings.

First Embodiment

Figure 1:
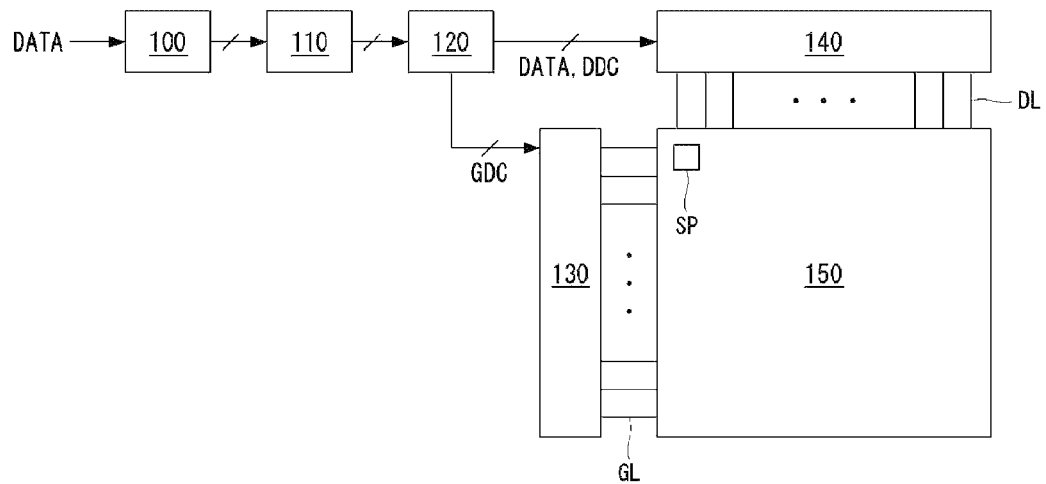
FIG. 1 is a schematic block diagram of a display device according to a first embodiment of the present invention.
Figure 2:
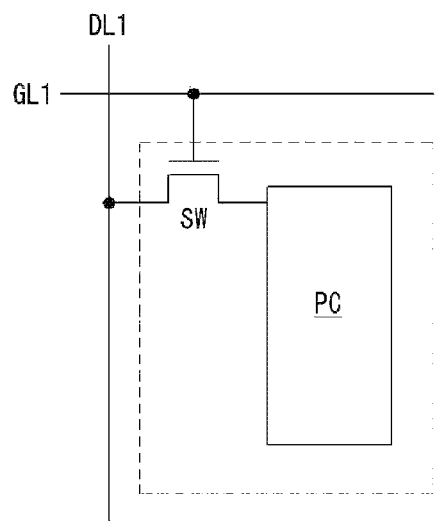
FIG. 2 is a schematic structure diagram of a sub-pixel shown in FIG. 1.

FIG. 1 is a schematic block diagram of a display device according to a first embodiment of the present invention; and FIG. 2 is a schematic structure diagram of a sub-pixel shown in FIG. 1.

A display device according to a first embodiment of the present invention may include an image processor 100, an image corrector 110, a timing controller 120, a gate driver 130, a data driver 140, and a display panel 150.

The image processor 100 image-processes an image signal DATA supplied from the outside, and supplies the processed signal to the timing controller 120. The image processor 100 may supply the image signal DATA and driving signals, such as a vertical synchronization signal Vsync, a horizontal synchronization signal Hsync, a data enable signal DE, and a clock signal CLK, to the timing controller 120.

The image corrector 110 corrects the distortion of the image, which is displayed on an edge region of the display panel 150, when the display panel 150 is bent or operated to be bent in an up and down or left and right direction to have a curvature radius at a particular angle. For achieving this, the image corrector 110 compresses or expands the image signal DATA in response to the curvature radius of the display panel 150, which will be described later.

The timing controller 120 controls the operation timing of the data driver 140 and the gate driver 130 by using the driving signals, such as the vertical synchronization signal Vsync, the horizontal synchronization signal Hsync, the data enable signal DE, and the clock signal CLK, which are supplied from the image processor 100. The timing controller 120 collects Extended Display Identification Data (EDID) including resolution, frequency, timing information, and the like of the display panel 150, or compensation data, from an external memory unit through the 12C interface or the like. The timing controller 120 outputs a gate timing control signal GDC for controlling the operation timing of the gate driver 130 or a data timing control signal DDC for controlling the operation timing of the data driver 140. The timing controller 120 supplies the image signal DATA together with the data timing control signal DDC to the data driver 140.

The data driver 140 samples and latches the image signal DATA in response to the data timing control signal DDC supplied from the timing controller 120, and then converts the image data DATA into gamma voltages to output the converted signal. The data driver 140 is formed as an Integrated Circuit (IC), which may be mounted on the display panel 150 or mounted on an external substrate connected to the display panel 150. The data driver 140 supplies the image signal DATA to sub-pixels SP included in the display panel 150 through the data lines DL.

The gate driver 130 outputs a gate signal while shifting levels of gate voltages, in response to the gate timing control signal GDC supplied from the timing controller 120. The gate driver 130 is formed as an IC, which may be mounted on the display panel 150 or mounted on an external substrate connected to the display panel 150. Alternatively, the gate driver 130 may be formed on the display panel in a Gate-In-Panel (GIP) type. The gate driver 130 supplies the gate signal to the sub-pixels SP included in the display panel 150 through the gate lines GL.

The display panel 150 displays an image in response to the gate signal supplied from the gate driver 130 and the image signal DATA supplied from the data driver 140. The display panel 150 includes sub-pixels SP controlling light to display an image.

A single sub-pixel includes a switching transistor SW connected to a gate line GL1 and a data line DL1 and a pixel circuit PC operating in response to the image signal DATA supplied through the switching transistor SW. The sub-pixels SP constitute a Liquid Crystal Display (LCD) panel or an Organic Light Emitting Display (OLED) panel according to the structure of the pixel circuit PC.

In the case where the display panel 150 constitutes the LCD panel, the pixel circuit PC includes a storage capacitor and a Liquid Crystal (LC) layer. The storage capacitor stores, as data voltages, the image signal DATA supplied through the switching transistor (SW). The LC layer is tilted in response to an electric field formed between a pixel electrode and a common electrode. The LCD panel is implemented in a Twisted Nematic (TN) mode, a Vertical Alignment (VA) mode, an In Plane Switching (IPS) mode, a Fringe Field Switching (FFS) mode, or an Electrically Controlled Birefringence (ECB) mode.

In the case where the display panel 150 constitutes the OLED panel, the pixel circuit PC includes a storage capacitor, a driving transistor, and an OLED. The storage capacitor stores, as data voltages, the image signal DATA supplied through the switching transistor (SW). The driving transistor supplies a driving current to the OLED. The OLED emits light in response to the driving current. The OLED panel is implemented in a top-emission manner, a bottom-emission manner, or dual-emission manner. Besides, the display panel 150 may be implemented as an Electro Phoretic Display (EPD) panel, an electro-wetting display panel, or the like.

Figure 3:
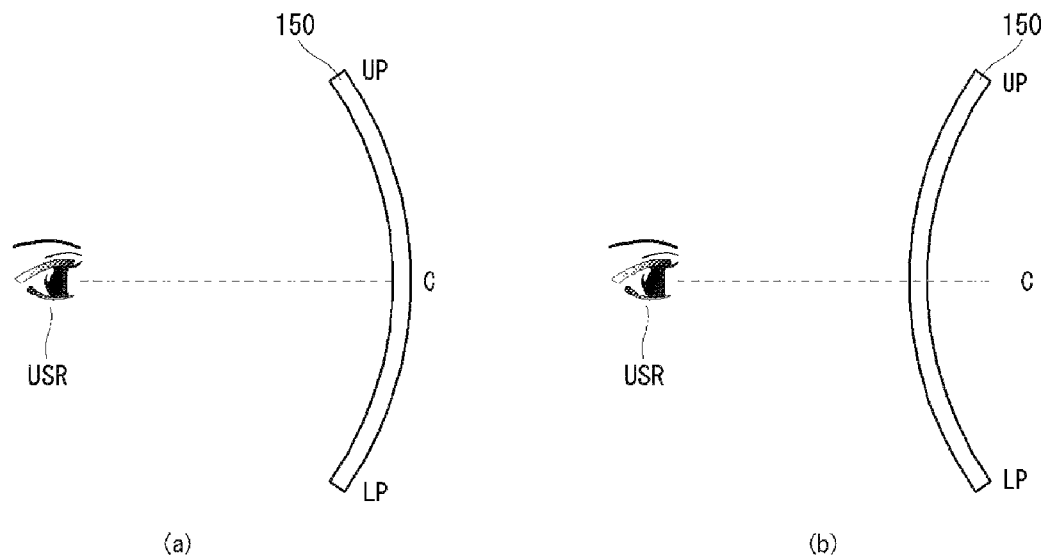
FIG. 3 illustrates display panels having curvature radii.
Figure 4:
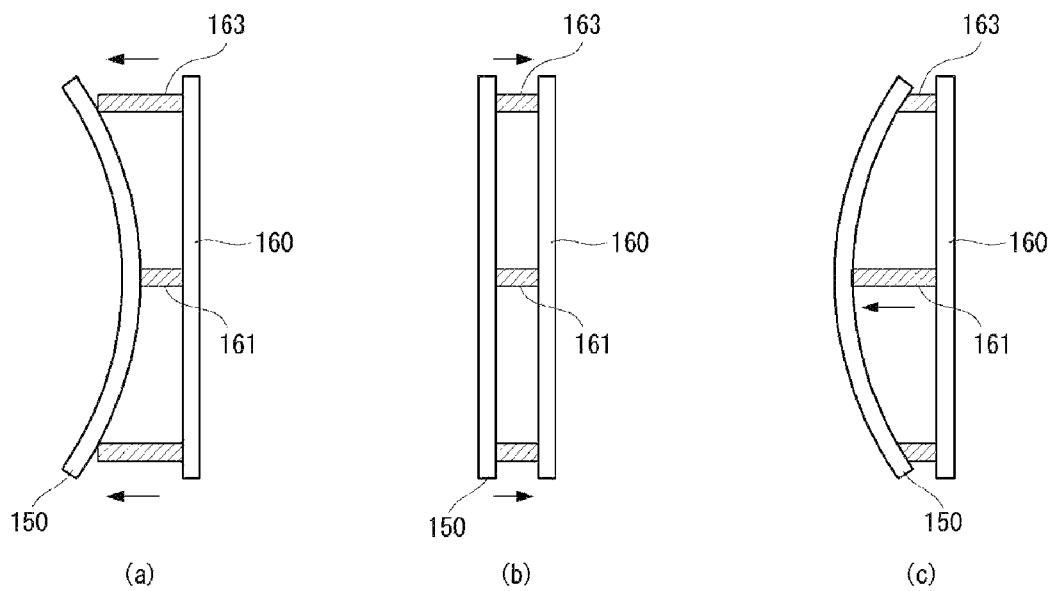
FIG. 4 illustrates exemplary views of forming a curvature radius on a display panel.
Figure 5:
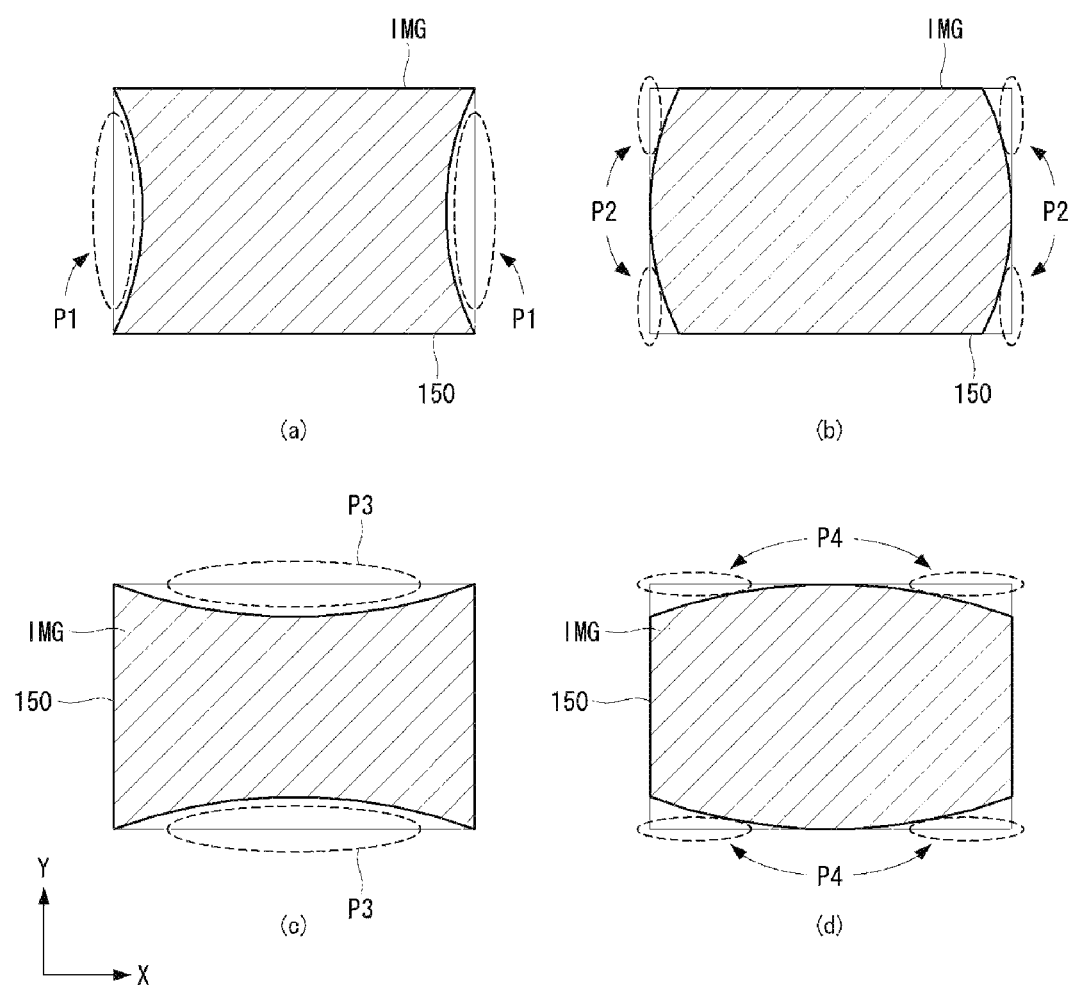
FIG. 5 illustrates problems occurring when images are displayed on display panels having curvature radii.

FIG. 3 illustrates display panels having curvature radii; FIG. 4 illustrates exemplary views of forming a curvature radius on a display panel; and FIG. 5 illustrates problems occurring when images are displayed on display panels having curvature radii.

A display panel 150 may be fixed to have a concave curvature radius when viewed from a user USR, as shown in (a) of FIG. 3. Alternatively, the display panel 150 may be fixed to have a convex curvature radius when viewed from the user USR, as shown in (b) of FIG. 3.

In order to allow the display panel 150 to have each of the above shapes, a rear substrate (having a curvature radius) capable of giving a predetermined angle to the display panel 150 may be attached to the display panel 150 in the manufacturing procedure. However, the display panel 150 may not be fixed to have a predetermined curvature radius as shown above. Instead, the display panel 150 may be operated such that an upper portion UP and a lower portion LP of the display panel 150 based on the central region C protrude or recede, and thereby the display panel 150 may have a curvature radius varying at a particular angle.

For achieving this, for example, as shown in FIG. 4, component control parts 160, 161, and 163 that form a curvature radius may be disposed on a rear surface of the display panel 150. In this case, the component control parts 160, 161, and 163 include a support part 160, at least one central region control part 161, and at least one outer peripheral region control part 163.

The support part 160 supports the central region control part 161 and the outer peripheral region control part 163. The central region control part 161 pushes or pulls a central region of the display panel 150. The at least one central region control part 161 may be h in height/length (or number) (e.g., h is an integer of 2 or greater) relative to the at least one outer peripheral region control part 163, but is not limited thereto. The outer peripheral region control part 163 pushes or pulls an outer peripheral region of the display panel 150. The at least one outer peripheral part 163 may be h in height/length (or number) (h is an integer of 2 or greater) at each of four outer peripheral regions relative to the at least one central region control part 161, but is not limited thereto.

For example, in the case where the display panel 150 has a concave curvature radius as shown in (a) of FIG. 3, the central region control part 161 may be fixed while the outer peripheral region control parts 163 may be rotated to push four surfaces of the display panel 150 as shown in (a) of FIG. 4.

For example, in the case where the display panel 150 has a convex curvature radius as shown in (b) of FIG. 3, the outer peripheral region control parts 163 may be fixed while the central region control part 161 may be rotated to push the central region of the display panel 150 as shown in (c) of FIG. 4.

Unlike this, in the case where the display panel 150 is formed in a usual state, that is, a flat state, the central region control part 161 and the outer peripheral region control parts 163 may hold default positions while being spaced apart from the display panel 150.

As described above, when an image is displayed on the display panel 150, which is configured to have a concave curvature or a convex curvature, the signal is distorted at a particular region depending on the curvature radius, as shown in FIG. 5.

For example, as shown in (a) and (b) of FIG. 5, in the case where the display panel 150 has a concave curvature radius, portions of an image IMG, which are displayed on edges at both left and right sides of the display panel 150, as indicated by P1, may be distorted, or portions of an image IMG, which are displayed on edges at upper and lower corners of both left and right sides of the display panel 150, as indicated by P2, may be distorted.

For example, as shown in (c) and (d) of FIG. 5, in the case where the display panel 150 has a convex curvature, portions of an image IMG, which are displayed on edge at both upper and lower sides of the display panel 150, as indicated by P3, may be distorted, or portions of an image IMG, which are displayed on edges at left and right corners of both upper and lower sides of the display panel 150, as shown as P4, may be distorted.

According to the present invention, when the display panel 150 is bent or operated to be bent in an up and down or left and right direction to have a particular angle of curvature radius, the distortion of the image IMG displayed on the edges of the display panel 150 can be corrected as follows.

Figure 6:
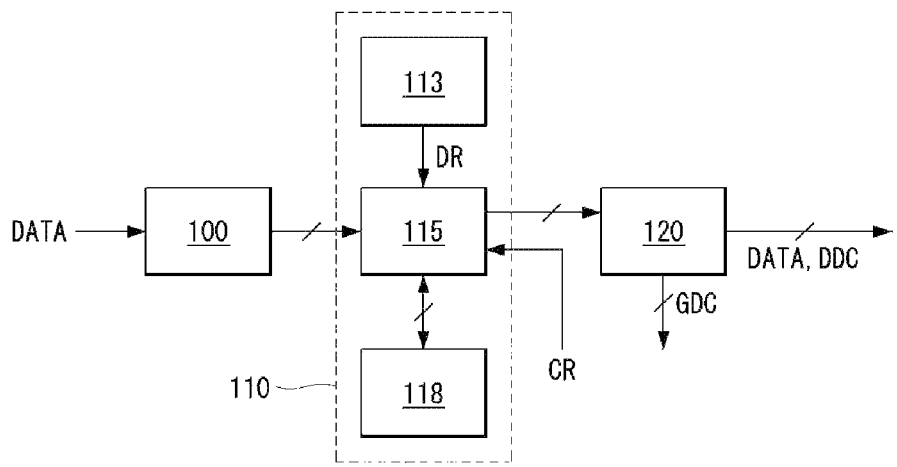
FIG. 6 is a block diagram of a part of the display device according to the first embodiment of the present invention.
Figure 7:
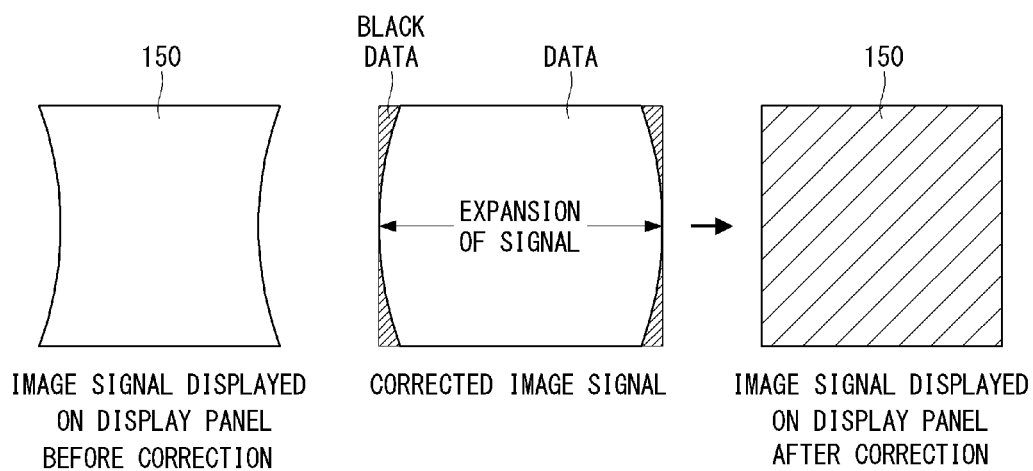
FIGS. 7 and 8 are views for better understanding of image corrections in the display device according to the first embodiment of the present invention.
Figure 8:
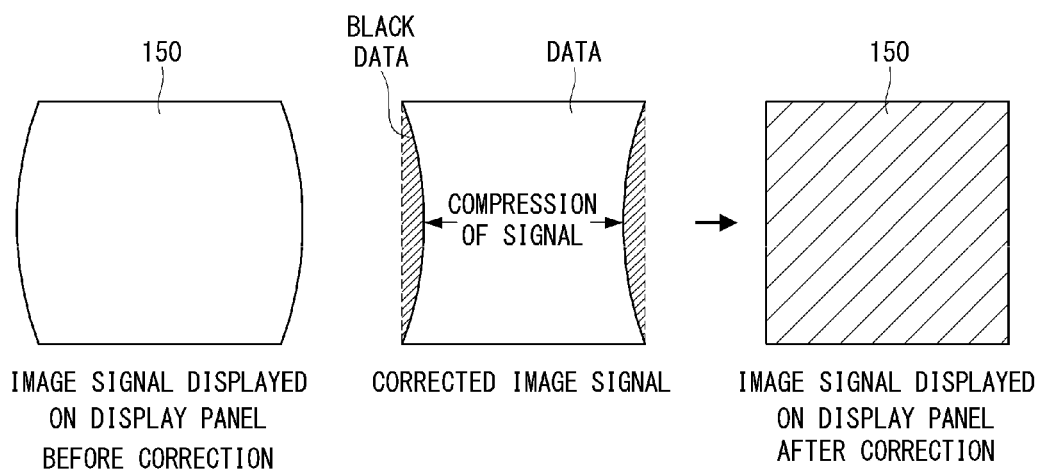

FIG. 6 is a block diagram of a part of the display device according to the first embodiment of the present invention; and FIGS. 7 and 8 are views for better understanding of image corrections in the display device according to the first embodiment of the present invention.

The display device according to the first embodiment of the present invention includes an image corrector 110 that corrects the image signal DATA output from the image processor 100 to supply it to the timing controller 120.

The image corrector 110 compression-corrects or expansion-corrects the image signal DATA (or image) such that an edge portion of the image signal DATA concavely recedes or convexly protrudes, in response to the curvature radius of the display panel 150.

The image corrector 110 includes a lookup table 113, a memory unit 118, and a correction unit 115. The lookup table 113 stores curvature coefficients according to curvature radii of the display panel 150. The memory unit 118 temporarily stores the image signal DATA output from the image processor 100. The correction unit 115 reads the image signal DATA by the line unit from the memory unit, reads a curvature coefficient DR corresponding to the curvature radius of the display panel 150 from the lookup table 113, and corrects and outputs the image signal DATA by the line unit based on the read curvature coefficient DR.

Meanwhile, in the case where the display panel 150 is fixed to have a concave curvature radius or a convex curvature radius, the curvature coefficient is fixed and thus may not be stored in the lookup table 113. Unlike this, in the case where the display panel 150 is varied to have a concave curvature radius or a convex curvature radius according to a particular image of a user, curvature coefficients thereof are variously prepared and thus stored in the lookup table 113.

In the case where the display panel 150 is varied to have a concave curvature radius or a convex curvature radius according to the user setting, a particular image, or the like, the correction unit 115 may receive a current curvature radius (CR) of the display panel 150 from the component control parts 160, 161, and 164. Then, the correction unit 115 reads the curvature coefficient DR corresponding to the current curvature radius supplied from the component control parts 160, 161, and 163, and corrects and outputs the image signal DATA by the line unit based on the read curvature coefficient DR.

As the image corrector 110 is configured as above, the image signal DATA is convexly corrected when the display panel 150 is bent to have a concave curvature, or the image signal DATA is concavely corrected when the display panel 150 is bent to have a convex curvature. That is, the image corrector 110 corrects the image data DATA through phase inverse correction to thereby display an image having an opposite shape to the curvature radius of the display panel 150. Meanwhile, when the display panel 150 is flat, the image corrector 110 does not correct the image signal DATA and outputs the image signal DATA as it is.

Hereinafter, there will be described cases where distortion of the image displayed on the display panel 150 is corrected by using the image corrector 110 according to the first embodiment.

[Display Panel Having Concave Curvature Radius]

In the case where an image signal before correction is supplied to a display panel 150 having a concave curvature radius, a distorted image is displayed on the display panel 150 as shown in a left part of FIG. 7.

Since the display panel 150 is bent to have a concave curvature radius, the image corrector 110 corrects the image signal DATA to be convex in response to the curvature coefficient DR, as shown in a center part of FIG. 7. The image processor 110 expands a portion of the image signal DATA, which is to be displayed on a central region of the display panel 150, such that the image signal DATA is convexly corrected. In addition, black data are inserted into a region other than the convexly corrected region, together with the signal expansion. Here, as the black data, any type of data that contain only data and have grayscales not substantially expressed on the display panel 150 may be also employed.

In the case where the thus corrected image signal DATA is supplied to the display panel 150 having a concave curvature radius, an almost normal image is displayed on the display panel 150, as shown in a right part of FIG. 7.

[Display Panel Having Convex Curvature Radius]

In the case where an image signal before correction is supplied to a display panel 150 having a convex curvature radius, a distorted image is displayed on the display panel 150 as shown in a left part of FIG. 8.

Since the display panel 150 is bent to have a convex curvature radius, the image corrector 110 corrects the image signal DATA to be concave in response to the curvature coefficient DR, as shown in a center part of FIG. 8. The image processor 110 compresses a portion of the image signal DATA, which is to be displayed on a central region of the display panel 150, such that the image signal DATA is concavely corrected. In addition, black data are inserted into a region other than the concavely corrected region, together with the signal expansion. Here, as the black data, any type of data that contain only data and have grayscales not substantially expressed on the display panel 150 may be employed.

In the case where the thus corrected image signal DATA is supplied to the display panel 150 having convex curvature, an almost normal image is displayed on the display panel 150, as shown in a right part of FIG. 8.

As described in the first embodiment of the present invention, when the image signal is corrected to have a revere phase against the curvature diameter of the display panel, there can be solved the problem that the image displayed in a particular region is distorted, and thus the display quality can be improved.

Second Embodiment

Figure 9:
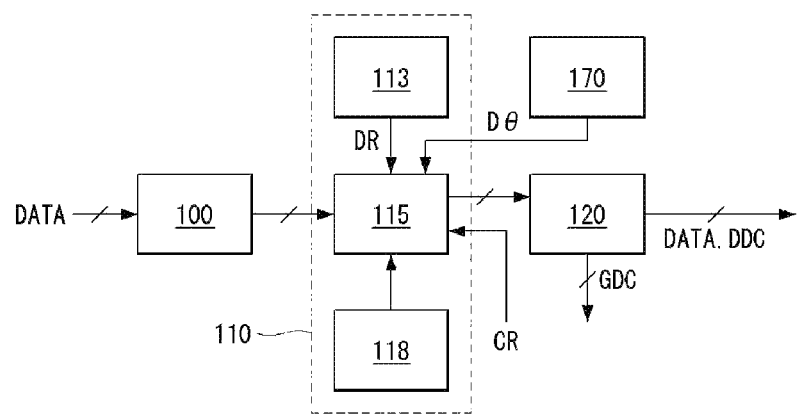
FIG. 9 is a block diagram of a part of a display device according to a second embodiment of the present invention.
Figure 10:
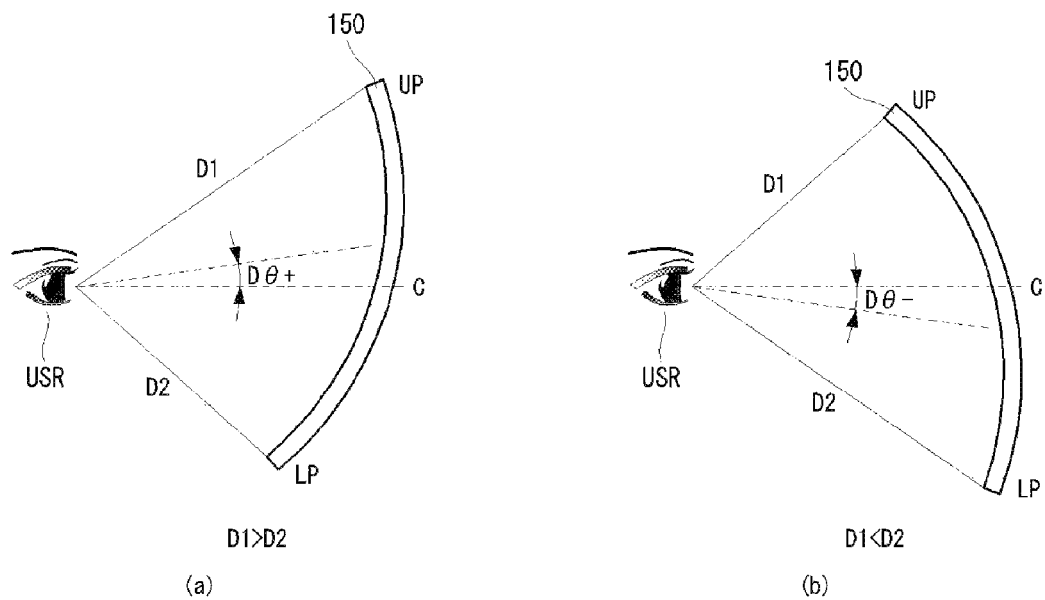
FIG. 10 illustrates distance differences from upper and lower viewpoints depending on the tilt of a display panel.
Figure 11:
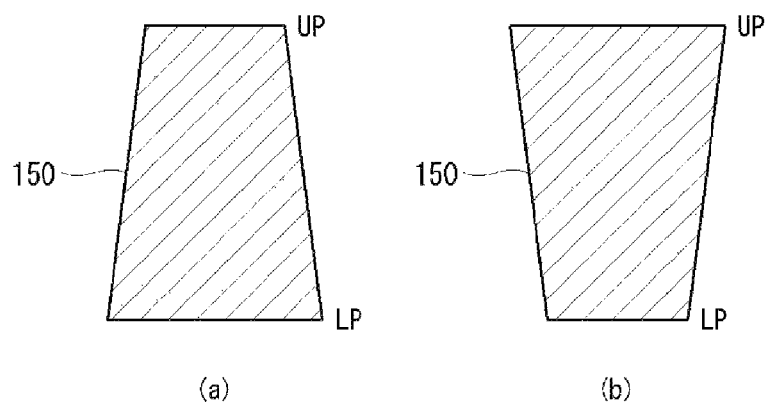
FIG. 11 illustrates image distortions due to the distance differences from upper and lower viewpoints shown in FIG. 10.
Figure 12:
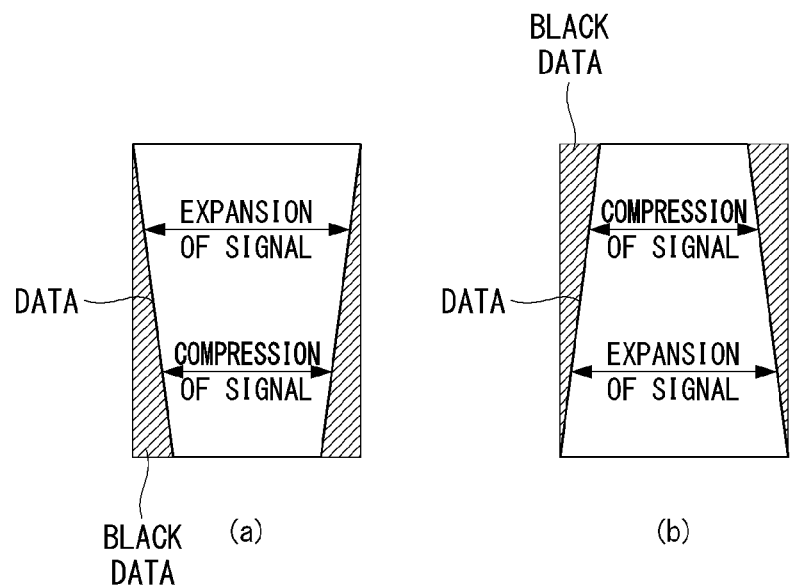
FIGS. 12 and 13 are views for better understanding of image corrections in the display device according to the second embodiment of the present invention.
Figure 13:
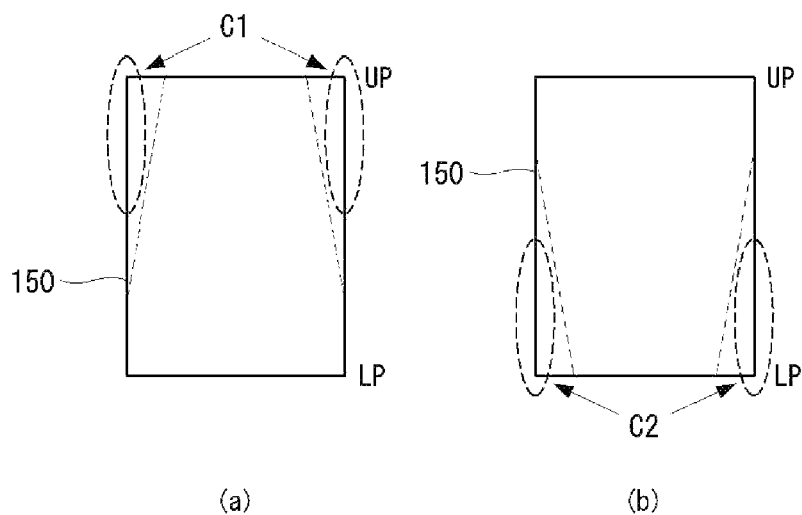

FIG. 9 is a block diagram of a part of a display device according to a second embodiment of the present invention; FIG. 10 illustrates distance differences from upper and lower viewpoints depending on the tilt of a display panel; FIG. 11 illustrates image distortions due to the distance differences from upper and lower viewpoints shown in FIG. 10; and FIGS. 12 and 13 are views for better understanding of image corrections in the display device according to the second embodiment of the present invention.

The display device according to the second embodiment of the present invention includes an image corrector 110 that corrects an image signal DATA output from an image processor 100 to supply the image signal DATA to a timing controller 120. The display device according to the second embodiment of the present invention further includes a tilt sensor 170 that generates angle information Dθ corresponding to a tilt of the display panel 150.

The image corrector 110 compression-corrects or expansion-corrects the image signal DATA (or image) such that an edge portion of the image signal DATA concavely recedes or convexly protrudes, in response to the curvature of the display panel 150.

The image corrector 110 includes a lookup table 113, a memory unit 118, and a correction unit 115. The lookup table 113 stores curvature coefficients according to curvature radii of the display panel 150. The memory unit 118 temporarily stores the image signal DATA output from the image processor 100. The correction unit 115 reads the image signal DATA by the line unit from the memory unit, reads the curvature coefficient DR corresponding to the curvature radius of the display panel 150 from the lookup table 113, and corrects and outputs the image signal DATA by the line unit based on the read curvature coefficient DR.

In the case where the display panel 150 is fixed to have a concave curvature radius or a convex curvature radius, the curvature coefficient is fixed and thus may not be stored in the lookup table 113. However, in the case where the display panel 150 is varied to have a concave curvature radius or a convex curvature radius according to the user setting, a particular image, or the like, curvature coefficients are variously prepared and thus stored in the lookup table 113.

When the display panel 150 is varied to have a concave curvature radius or a convex curvature radius in response to the user setting, a particular image, or the like, the correction unit 115 may receive a current curvature radius CR of the display panel 150 from the component control parts 160, 161, and 164. In addition, the correction unit 115 reads the curvature coefficient DR corresponding to the current curvature radius supplied from the component control parts 160, 161, and 163, and corrects and outputs the image signal DATA by the line unit based on the read curvature coefficient DR.

As the image corrector 110 is configured as above, the image signal DATA is convexly corrected when the display panel 150 is bent to have a concave curvature radius, or the image signal DATA is concavely corrected when the display panel 150 is bent to have a convex curvature radius. That is, the image corrector 110 corrects the image data DATA through phase inverse correction to thereby display an image having an image having an opposite shape to the curvature radius of the display panel 150. Meanwhile, when the display panel 150 is flat, the image corrector 110 does not correct the image signal DATA and outputs the image signal DATA as it is.

The image corrector 110 partially corrects the image signal DATA based on the angle information Dθ supplied form the tilt sensor 170. A method of partially correcting, by the image corrector 110, the image signal DATA based on the angle information Dθ supplied form the tilt sensor 170 will be described as follows.

In the case where the display panel 150 having a curvature radius is tilted such that a central region C of the display panel 150 is positioned below a viewpoint of a user USR as shown in (a) of FIG. 10, a first distance between the viewpoint of the user USR and an upper portion UP of the display panel, "D1", is longer than a second distance between the viewpoint of the user USR and a lower portion LP of the display panel, "D2". That is, the first distance D1 is greater than the second distance D2. In this case, as the upper portion UP of the display panel 150 is tilted backwards, the comparison angle of the central region C of the display panel 150 rises as indicated by "Dθ+".

In the case where the display panel 150 having curvature is tilted such that the central region C of the display panel 150 is positioned above the viewpoint of the user USR as shown in (b) of FIG. 10, the second distance between the viewpoint of the user USR and the lower portion LP of the display panel, "D2", is longer than the first distance between the viewpoint of the user USR and the upper portion UP of the display panel, "D2". That is, the second distance D2 is greater than the first distance D1. In this case, as the upper portion UP of the display panel 150 is tilted forwards, the comparison angle based on the central region C of the display panel 150 falls as indicated by "Dθ−".

The tilt sensor 170 supplies angle information Dθ to a correction unit, the angle information Dθ being obtained according to the change of the comparison angle based on the central region C of the display panel 150. Then, the correction unit 115 may convert the angle information Dθ into distance difference information from the upper and lower viewpoints according to the tilt between the user USR and the display panel 150, and then may correct the image signal DATA displayed on the display panel based on the upper-and-lower viewpoint distance difference information such that at least one of upper and lower portions of the image signal DATA is expanded.

FIG. 10 illustrates only a case where the display panel is tilted in an up and down direction. However, the tilt sensor 170 can obtain angle information Dθ in the above-described manner even when the display panel 150 is tilted in a left and right direction. The correction unit 115 may convert the angle information Dθ into left-and-right viewpoint distance difference information according to the tilt of the display panel 150, and then may correct the image signal DATA displayed on the display panel based on the left-and-right viewpoint distance difference information such that at least one of left and right portions of the image signal DATA is expanded.

The above descriptions have been set forth for the case where the tilt sensor 170 obtains angle information Dθ and the correction unit 115 converts the angle information Dθ into distance difference information from the left and right viewpoints according to the tilt of and the display panel 150. However, the tilt sensor 170 may obtain the angle information Dθ, and may convert the angle information Dθ into distance difference information according to the tilt between the user USR and the display panel 150 to output the converted information. The above descriptions have been given for the case where only the tilt sensor 170 is used. However, when the display panel 150 has a sensor or the like capable of measuring the distance between the user USR and the display panel 150, the tilt sensor 170 may be replaced with a distance sensor, or both the tilt sensor 170 and the distance sensor may be included in the display panel 150.

Hereinafter, the correction of the distance difference from the upper and lower viewpoints due to the tilt of the display panel 150 by using the image corrector 110 according to the second embodiment will be described.

In the case where the lower portion LP of the display panel 150 is tilted closer to the user viewpoint as shown in (a) of FIG. 11, the upper portion UP of the display panel 150 is farther from the user. Therefore, the lower portion LP of the display panel 150 is shown to be expanded as compared with the upper portion UP of the display panel 150.

In the case where the upper portion UP of the display panel 150 is tilted closer to the user viewpoint as shown in (b) of FIG. 11, the lower portion LP of the display panel is farther from the user. Therefore, the upper portion UP of the display panel 150 is shown to be expanded as compared with the lower portion LP of the display panel 150.

As described above, the display panel 150 having a curvature radius has a problem that, since the central region and the edge region have a difference in perspective, a display region far from a user is shown to be expanded as compared with a display region closer to the user. For solving this problem, the image corrector 110 corrects the image signal DATA displayed on the display panel 150 based on the angle information Dθ such that at least one of upper, lower, left, and right portions of the image signal DATA is expanded.

For example, the image corrector 110 receives the angle information Dθ, and then, corrects the image signal DATA through phase inversion correction as shown in (a) of FIG. 12 when the display panel 150 is tilted as shown in (a) of FIG. 11. Specifically, since the lower portion LP of the display panel is shown to be expanded, the image corrector 110 expansion-corrects the upper portion of the image signal DATA and compression-corrects the lower portion of the image signal DATA such that the image signal DATA has an inversion phase. In addition, black data are inserted into a region other than the compressed region.

When the image signal DATA is corrected as described above and then supplied to the display panel 150, the upper and lower portions of the image are uniformly shown since the lower portion of the image is not shown to be expanded through correction of the upper portion UP of the image as shown in "C1" in (a) of FIG. 13.

For example, the image corrector 110 receives the angle information Dθ, and then, corrects the image signal DATA through phase inversion correction as shown in (b) of FIG. 12 when the display panel 150 is tilted as shown in (b) of FIG. 11. Specifically, since the upper portion UP of the display panel 150 is shown to be expanded, the image corrector 110 expansion-corrects the lower portion of the image signal DATA and compression-corrects the upper portion of the image signal DATA such that the image signal DATA has an inversion phase. In addition, black data are inserted into a region other than the compressed region.

When the image signal DATA is corrected as described above and then supplied to the display panel 150, the upper and lower portions of the image are uniformly shown since the upper portion of the image is not shown to be expanded through correction of the lower portion LP of the image as shown in "C2" in (b) of FIG. 13. As described in the second embodiment of the present invention, when the image signal is corrected to have a revere phase against the tilt of the display panel, the problem that the image displayed in a particular region is distorted can be solved, and thus the display quality can be improved.

Hereinafter, another embodiment of the present invention will be described.

Figure 14:
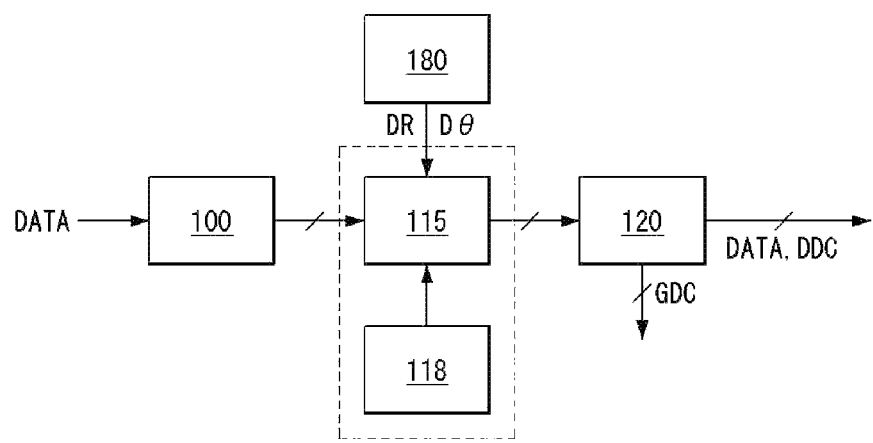
FIGS. 14 and 15 are block diagrams illustrating another embodiment of the present invention.
Figure 15:
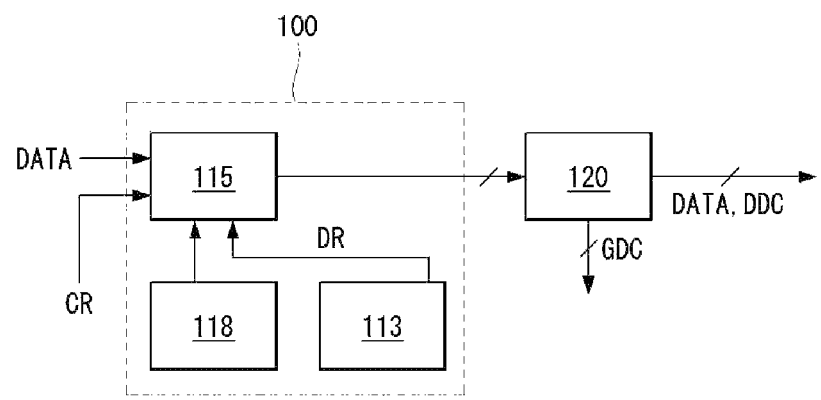

FIGS. 14 and 15 are block diagrams illustrating another embodiment of the present invention.

According to the embodiment of the present invention as shown in FIG. 14, a user may input the curvature coefficient DR or angle information Dθ of the display panel 150 through an external input unit such as a remote controller or the like. In this case, the image corrector 110 may correct the image signal DATA based on the variables DR and Dθ input through the external input unit 180 without referring to a lookup table. That is, in the first and second embodiments, the variables DR and Dθ are automatically generated by the image corrector 110 and an apparatus linked therewith, and the image signal DATA is corrected in response to the variables DR and Dθ. However, according to the embodiment shown in FIG. 14, correction is conducted in a manual type.

According to another embodiment of the present invention as shown in FIG. 15, a lookup table 113, a memory unit 118, and a correction unit 115 are integrated in the image processor 110. In this case, the configuration of the apparatus can be simplified.

Hereinafter, a driving method of the display device according to the present invention will be described.

Figure 16:
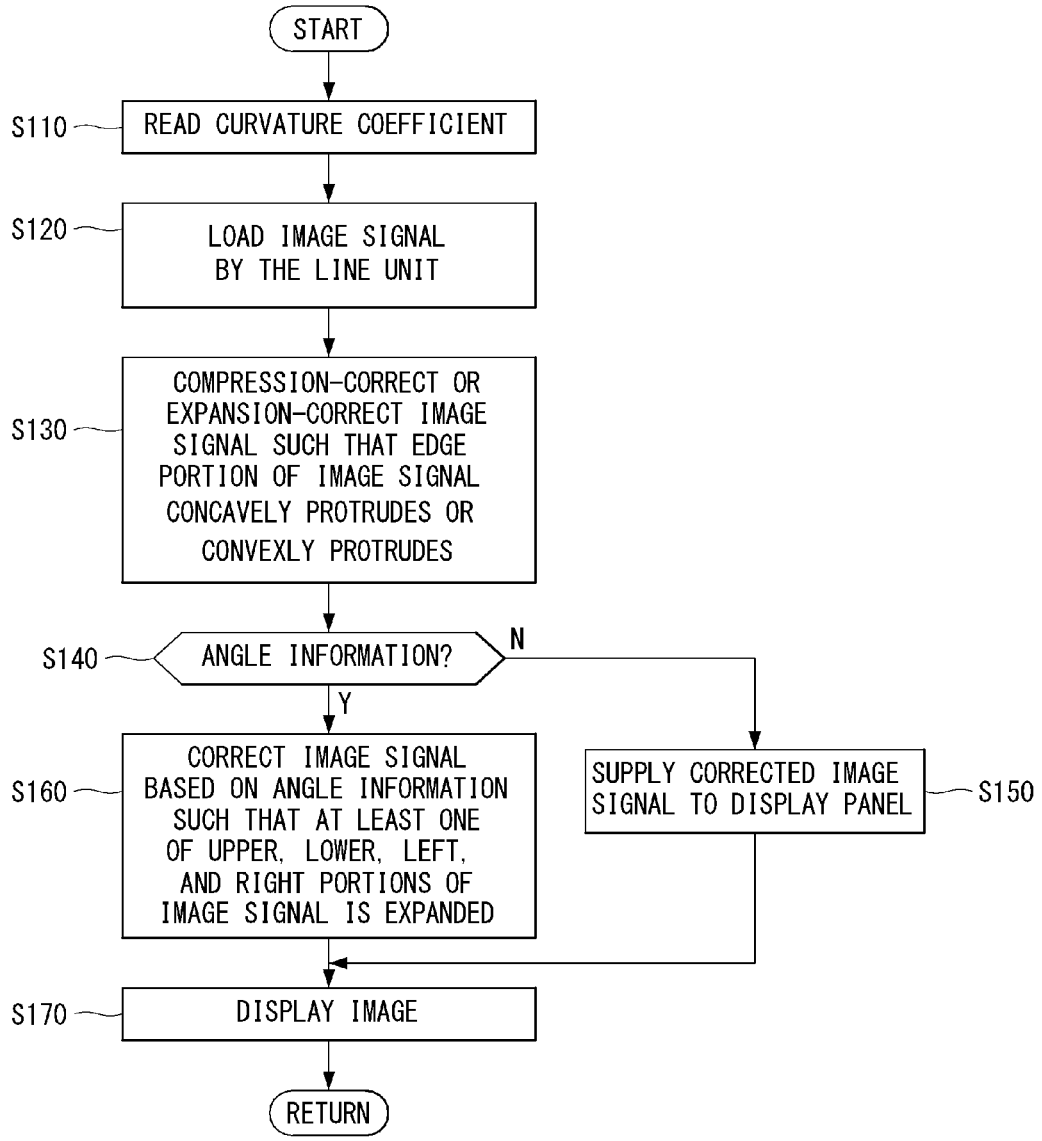
FIG. 16 is a flowchart illustrating a driving method of a display device according to the present invention.

FIG. 16 is a flowchart illustrating a driving method of a display device according to an embodiment of the present invention.

First, a curvature coefficient of the display panel is read (S110).

Then, an image signal to be supplied to the display panel is read by the line unit (S120).

Then, the image signal is compression-corrected or expansion-corrected based on the curvature coefficient corresponding to the curvature radius of the display panel such that an edge portion of the image signal concavely recedes or convexly protrudes (S130). Here, the image signal is convexly corrected when the display panel is bent to have a concave curvature, or concavely corrected when the display panel is bent to have a convex curvature. The image signal may not be corrected when the display panel is flat.

Then, the corrected image signal is supplied to the display panel (S150).

Then, an image is displayed based on the corrected image signal (S170).

If, in the correction step (S130), angle information is not input (N in S140), the above-described flow continues. However, if, in the correction step of S130, angle information is input (Y in S140), the angle information corresponding to the tilt of the display panel is received.

Then, the image signal is corrected based on the angle information such that at least one of upper, lower, left, and right portions of the image signal is expanded (S160).

Then, an image is displayed based on the corrected image signal (S170).

As described above, the driving method of the display device according to the present invention has been schematically described. However, the driving method of the display device according to the present invention is based on the descriptions of the first and second embodiments, and thus needs to be construed based on the descriptions.

As set forth above, according to the display device and the driving method thereof of the present invention, the image signal is corrected to have a revere phase against at least one of the curvature diameter of the display panel and the tilt of the display panel, so that the problem that the image displayed in a particular region is distorted can be solved, and thus the display quality can be improved.

What is claimed is:

1. A display device, comprising:
    a display panel having a curvature radius;
    a plurality of region control parts attached to respective regions of the display panel configured to control the curvature radius of the display panel;
    a driver driving the display panel;
    a timing controller controlling the driver;
    an image processor supplying an image signal to the timing controller; and
    an image corrector automatically compression-correcting or expansion-correcting the image signal in response to a change to the curvature radius of the display panel such that an edge portion of the image signal concavely recedes or convexly protrudes,
        wherein the image corrector corrects the image signal to be convex when the display panel is bent to have a concave curvature radius,
        corrects the image signal to be concave when the display panel is bent to have a convex curvature radius,
        and does not correct the image signal when the display panel is flat,
    wherein the image corrector:
        receives, from the plurality of region control parts, curvature information representing a current curvature radius of the display panel;
        retrieves, from a lookup table, a curvature coefficient corresponding to the current curvature radius of the panel; and
        corrects the image signal based on the retrieved curvature coefficient.

2. The display device of claim 1, wherein the image corrector comprises:
    a lookup table storing curvature coefficients corresponding to curvature radii in the display panel;
    a memory unit temporally storing the image signal; and
    a correction unit reading the image signal from the memory unit, reading a curvature coefficient corresponding to the curvature radius of the display panel from the lookup table, and correcting and outputting the image signal based on the curvature coefficient.

3. The display device of claim 2, wherein the image corrector corrects the image signal to be convex and inserts black data into a region of the image signal other than the convexly corrected region of the image signal when the display panel is bent to have a concave curvature radius, and corrects the image signal to be concave and inserts black data into a region of the image signal other than the concavely corrected region of the image signal when the display panel is bent to have a convex curvature radius.

4. The display device of claim 1, further comprising a tilt sensor generating angle information corresponding to a tilt of the display panel, wherein the image corrector partially corrects the image signal based on the angle information supplied from the tilt sensor.

5. The display device of claim 4, wherein the image corrector corrects the image signal displayed on the display panel based on the angle information such that at least one of upper, lower, left, and right portions of the image signal is expanded.

6. A driving method of a display device, the method comprising:
    reading a curvature coefficient of a display panel;
    reading an image signal, which is to be supplied to the display panel;
    automatically compression-correcting or expansion-correcting the image signal based on a change to the curvature coefficient corresponding to the curvature of the display panel such that an edge portion of the image signal concavely recedes or convexly protrudes,
        the compression-correcting or expansion-correcting comprising convexly correcting the image signal when the display panel is bent to have a concave curvature radius,
        concavely correcting the image signal when the display panel is bent to have a convex curvature radius, and
        not correcting the image signal when the display panel is flat;
    receiving, from the plurality of region control parts, curvature information representing a current curvature radius of the display panel;
    retrieving, from a lookup table, a curvature coefficient corresponding to the current curvature radius of the panel;
    correcting the image signal based on the retrieved curvature coefficient; and
    supplying the corrected image signal to the display panel and displaying the corrected image signal on the display panel.

7. The method of claim 6, wherein the compression-correcting or expansion-correcting of the image signal further comprises:
    receiving angle information corresponding to a tilt of the display panel; and
    correcting the image signal based on the angle information such that at least one of upper, lower, left, and right portions of the image signal is expanded.

8. The method of claim 6, wherein the compression-correcting or expansion-correcting of the image signal further comprises:
    when the display panel is bent to have a concave curvature radius, correcting the image signal to be convex and inserting black data into a region of the image signal other than the convexly corrected region of the image signal; and
    when the display panel is bent to have a convex curvature radius, correcting the image signal to be concave and inserting black data into a region of the image signal other than the concavely corrected region of the image signal.

9. The display device of claim 1, wherein the plurality of region control parts are configured to control the curvature radius of the display panel by pushing or pulling the respective regions of the display panel, the plurality of region control parts including a central region control part attached to a central region of the display panel and one or more peripheral region control parts attached to the peripheral regions of the display panel.

10. The method of claim 6, further comprising:
    adjusting, by a plurality of region control parts attached to respective regions of the display panel, a curvature radius of the display panel by pushing or pulling the respective regions of the display panel.

11. The display device of claim 5, wherein the image corrector corrects the image signal displayed on the display panel based on the angle information, by inverse phase correction, to compression-correct a portion of an image signal to be provided to a region of the display tilted closer to a viewing user, and expansion-correct a portion of the image signal to be provided to a region of the display tilted closer to the viewing user.

12. The method of claim 7, correcting the image signal based on the angle information comprises:

correcting the image signal displayed on the display panel based on the angle information, by inverse phase correction, to compression-correct a portion of an image signal to be provided to a region of the display tilted closer to a viewing user, and expansion-correct a portion of the image signal to be provided to a region of the display tilted closer to the viewing user.

13. A display device, comprising:

a display panel having a curvature radius;

a plurality of region control parts attached to respective regions of the display panel configured to control the curvature radius of the display panel;

a driver driving the display panel;

a timing controller controlling the driver;

an image processor supplying an image signal to the timing controller; and an image corrector automatically compression-correcting or expansion-correcting the image signal in response to a change to the curvature radius of the display panel such that an edge portion of the image signal concavely recedes or convexly protrudes, wherein the image corrector corrects the image signal to be convex when the display panel is bent to have a concave curvature radius, corrects the image signal to be concave when the display panel is bent to have a convex curvature radius, and does not correct the image signal when the display panel is flat, wherein the image corrector corrects the image signal to be convex and inserts black data into a region of the image signal other than the convexly corrected region of the image signal when the display panel is bent to have a concave curvature radius, and corrects the image signal to be concave and inserts black data into a region of the image signal other than the concavely corrected region of the image signal when the display panel is bent to have a convex curvature radius and wherein the image corrector:

receives, from the plurality of region control parts, curvature information representing a current curvature radius of the display panel;

retrieves, from a lookup table, a curvature coefficient corresponding to the current curvature radius of the panel; and corrects the image signal based on the retrieved curvature coefficient.

14. A driving method of a display device, the method comprising:

reading a curvature coefficient of a display panel;

reading an image signal, which is to be supplied to the display panel;

automatically compression-correcting or expansion-correcting the image signal based on a change to the curvature coefficient corresponding to the curvature of the display panel such that an edge portion of the image signal concavely recedes or convexly protrudes, the compression-correcting or expansion-correcting comprising convexly correcting the image signal when the display panel is bent to have a concave curvature radius, concavely correcting the image signal when the display panel is bent to have a convex curvature radius, and not correcting the image signal when the display panel is flat;

receiving, from the plurality of region control parts, curvature information representing a current curvature radius of the display panel;

retrieving, from a lookup table, a curvature coefficient corresponding to the current curvature radius of the panel;

correcting the image signal based on the retrieved curvature coefficient; and supplying the corrected image signal to the display panel and displaying the corrected image signal on the display panel, wherein the compression-correcting or expansion-correcting of the image signal further comprises:

when the display panel is bent to have a concave curvature radius, correcting the image signal to be convex and inserting black data into a region of the image signal other than the convexly corrected region of the image signal; and when the display panel is bent to have a convex curvature radius, correcting the image signal to be concave and inserting black data into a region of the image signal other than the concavely corrected region of the image signal.

15. The display device of claim 1, further comprising a plurality of region control parts attached to respective regions of the display panel and a support part, the plurality of region control parts configured to control the curvature radius of the display panel.

* * * * *